US006396938B1

(12) United States Patent
Tao et al.

(10) Patent No.: US 6,396,938 B1
(45) Date of Patent: May 28, 2002

(54) AUTOMATIC FEATHER SEXING OF POULTRY CHICKS USING ULTRAVIOLET IMAGING

(75) Inventors: Yang Tao; Joel Walker, both of Fayetteville, AR (US)

(73) Assignee: University of Arkansas, N.A., Little Rock, AR (US)

( * ) Notice: Subject to any disclaimer, the term of this patent is extended or adjusted under 35 U.S.C. 154(b) by 0 days.

(21) Appl. No.: 09/258,725

(22) Filed: Feb. 26, 1999

Related U.S. Application Data
(60) Provisional application No. 60/092,304, filed on Jul. 9, 1998, and provisional application No. 60/076,342, filed on Feb. 27, 1998.

(51) Int. Cl.[7] .................................................. G06K 9/00
(52) U.S. Cl. ..................................... 382/110; 209/509
(58) Field of Search ......................... 382/110; 209/509, 209/555, 556, 557, 559, 578, 587, 933; 600/410, 415, 420, 425, 437

(56) References Cited

U.S. PATENT DOCUMENTS

| | | | | |
|---|---|---|---|---|
| 3,570,487 A | | 3/1971 | Reynolds | 128/223 |
| 3,661,259 A | * | 5/1972 | Reynolds | 209/551 |
| 3,704,688 A | | 12/1972 | Wilson | 119/22 |
| 3,777,752 A | | 12/1973 | Goodwin | 128/173 |
| 3,994,292 A | * | 11/1976 | Goodein | 128/200 |
| 4,417,663 A | * | 11/1983 | Suzuki | 209/587 |
| 5,679,514 A | * | 10/1997 | Baker | 435/6 |
| 6,029,080 A | * | 2/2000 | Reynnells et al. | 600/407 |

* cited by examiner

*Primary Examiner*—Leo Boudreau
*Assistant Examiner*—Abolfazl Tabatabai
(74) *Attorney, Agent, or Firm*—Head, Johnson & Kachigian (57) ABSTRACT

The invention addresses the above referenced need in the art. In particular, the invention provides an improved method for automatic chick sexing. Under regular lighting, the color intensity of down and feather of baby chicks are essentially the same and it is difficult to separate the feathers in the image. By using UV light, the optical system significantly enhanced the feathers by suppressing the downs in images. It produced clear feather signals for subsequent identification and allocation of feathers in the image. The feather image segments could be obtained through thresholding with any value from 200 to 230 on the 255 maximum intensity scale. Important features of the invention include a video camera, special lighting, an image processing system and a computer for analysis. The digital video camera captures a clear image of chick wings using selected light wavelengths including long UV wavelengths) and particularly wavelengths from 250 nanometers to 450 nanometers. Special lighting architecture provides maximum illumination enhancement and feature extraction for the camera and the pattern recognition software. The digital image processing system processes signals from the camera and it makes instantaneous image analysis. The computer system hosts the digital imaging system and it executes the decisions made by the digital image processing system.

16 Claims, 9 Drawing Sheets

| Index (k) | Blob Label | Area | Tip | Tip | Box max (x) | Box max (y) | Length (L) | Centroid X | Centroid Y | Cen Dist | Cen Parallel Dist | Pair | Length Difference of the pair | Diff Ratio | Residual |
|---|---|---|---|---|---|---|---|---|---|---|---|---|---|---|---|
| 1 | 9 | 80 | 233 | 116 | 261 | 124 | 31.03 | 248 | 120 | | | | | | 3.52 |
| 2 | 6 | 263 | 241 | 101 | 303 | 130 | 72.38 | 271 | 116 | 23.91 | 24.60 | --- | --- | --- | -6.28 |
| 3 | 7 | 156 | 261 | 104 | 299 | 121 | 43.77 | 280 | 112 | 9.42 | 9.20 | --- | --- | --- | 3.87 |
| 4 | 2 | 187 | 287 | 96 | 320 | 120 | 40.96 | 305 | 109 | 24.76 | 23.71 | Pair | 2.81 | 0.07 | -1.38 |
| 5 | 4 | 111 | 305 | 98 | 329 | 115 | 29.92 | 318 | 107 | 13.05 | 12.51 | Pair | 11.04 | 0.31 | 1.08 |
| 6 | 1 | 116 | 331 | 95 | 351 | 117 | 29.86 | 341 | 106 | 23.70 | 23.41 | Pair | 0.06 | 0.00 | -1.51 |
| 7 | 3 | 102 | 349 | 97 | 365 | 117 | 25.85 | 358 | 108 | 16.54 | 15.71 | Pair | 4.01 | 0.14 | 0.43 |
| 8 | 5 | 151 | 379 | 99 | 389 | 123 | 25.36 | 384 | 112 | 26.14 | 26.42 | --- | --- | --- | 0.19 |
| 9 | 8 | 96 | 418 | 111 | 425 | 130 | 20.35 | 422 | 121 | 39.49 | 38.89 | Pair | 50.1 | 0.22 | 1.08 |
| 10 | 11 | 22 | 438 | 118 | 443 | 125 | 9.29 | 441 | 122 | 18.52 | 18.42--- | --- | --- | --- | -1.62 |
| 11 | 12 | 30 | 454 | 129 | 466 | 137 | 15.70 | 460 | 133 | 22.69 | 22.55 Pair | Pair | 6.412 | 0.51 | 0.65 |

FIGURE 6

| Index (k) | Blob Label | Area | Tip | Tip | Box max (x) | Box max (y) | Length (L) | Centroid X | Centroid Y | Cen Dist | Cen Parallel Dist | Pair | Length Difference of the pair | Diff Ratio | Residual |
|---|---|---|---|---|---|---|---|---|---|---|---|---|---|---|---|
| 1 | 17 | 47 | 118 | 139 | 138 | 148 | 23.75 | 128 | 143 | | | | | | 11.68 |
| 2 | 11 | 239 | 115 | 121 | 167 | 151 | 63.23 | 141 | 136 | 14 | | 15 Pair | 39.48 | 0.91 | -8.87 |
| 3 | 12 | 222 | 152 | 121 | 193 | 154 | 54.97 | 170 | 137 | 29 | | 32 pair | 8.26 | 0.14 | 8.48 |
| 4 | 4 | 471 | 157 | 91 | 198 | 144 | 67.66 | 177 | 120 | 19 | | 21--- | | | -20.68 |
| 5 | 19 | 14 | 197 | 145 | 201 | 148 | 6.32 | 199 | 146 | 35 | | 35--- | | | 36.75 |
| 6 | 2 | 288 | 203 | 83 | 220 | 120 | 41.73 | 211 | 102 | 45 | | 46--- | | | -24.80 |
| 7 | 7 | 288 | 199 | 110 | 228 | 156 | 56.69 | 211 | 134 | 32 | | 31 Pair | 14.96 | 0.30 | 1.90 |
| 8 | 8 | 235 | 240 | 113 | 254 | 155 | 45.65 | 247 | 134 | 35 | | 36 Pair | 11.04 | 0.22 | 8.39 |
| 9 | 1 | 445 | 250 | 82 | 262 | 142 | 63.17 | 256 | 113 | 22 | | 23--- | | | -21.91 |
| 10 | 9 | 124 | 277 | 119 | 284 | 144 | 25.29 | 281 | 132 | 31 | | 31--- | | | 15.19 |
| 11 | 5 | 383 | 291 | 92 | 306 | 142 | 52.98 | 298 | 116 | 23 | | 23 Pair | 27.69 | 0.71 | -13.35 |
| 12 | 14 | 57 | 314 | 129 | 325 | 145 | 20.68 | 320 | 136 | 30 | | 30 Pair | 32.3 | 0.88 | 17.98 |
| 13 | 6 | 347 | 325 | 98 | 355 | 149 | 60.90 | 340 | 122 | 25 | | 24 Pair | 40.22 | 0.99 | -17.12 |
| 14 | 18 | 36 | 347 | 143 | 357 | 152 | 14.40 | 352 | 147 | 27 | | 28 pair | 46.5 | 1.24 | 17.60 |
| 15 | 13 | 250 | 366 | 121 | 398 | 155 | 47.84 | 382 | 138 | 32 | | 32 pair | 33.44 | 1.07 | -13.89 |
| 16 | 20 | 150 | 396 | 146 | 426 | 168 | 38.38 | 411 | 158 | 35 | | 35--- | | | 2.66 |

| Recognition | | Males | Females | Correctness | Error |
|---|---|---|---|---|---|
| Actual | Males | 93 | 7 | 93% | 7% |
| | Females: | 7 | 101 | 94% | 6% |

-----Predicted-----

FIGURE 12

| Recognition | Predicted | | | |
|---|---|---|---|---|
| | | Male Bin ($Y < 6$) | Female Bin ($Y > 8$) | Uncertain Bin ($6 < Y$ zone $< 8$) |
| Actual | Males: | 80 (error free) | 6 | 12 |
| | | 82% | 6% | 12% |
| | Females: | 2 | 93 (error free) | 13 |
| | | 2% | 86% | 12% |
| | Error: | 2/82 | 6/99 | |
| | | 2% | 6% | |

AUTOMATIC FEATHER SEXING OF POULTRY CHICKS USING ULTRAVIOLET IMAGING

This appln. claims benefit of Prov. Nos. 60/092,304 Jul. 9, 1998 and 60/076,342 Feb. 27, 1998.

BACKGROUND OF THE INVENTION

Field of the Invention

The present invention relates to apparatus and methods for sorting day-old chicks by sex as determined by video imaging and digital image analysis (computer vision) and having distinctive features including lighting and light wavelengths to enhance imaging of distinguishing wing feather characteristics; camera placement, field of view, depth of field to provide an appropriate "field volume" in which to capture necessary images; physically presenting chick wings to the camera with the "field volume"; and software to rapidly analyze digital images and trigger sorting mechanisms. Features such as singulation, conveying, sorting, and digital imaging equipment may utilize off-the-shelf components.

Sex separation of baby chicks is still mostly done by hand as is discussed by D. S. Warren in "Distinguishing Sex of Chicks at Hatchery",Agricultural Experimental Station Bulletin 307, Kansas State college of Agricultural and Applied Science, Manhattan, Kans. (1942). Typically workers are positioned around chick sexing tables to observe and sort the males from the females by differences in chick wing feathers. For typical operations hatching 250,000 to 500,000 baby chicks a day, a crew of about ten to thirty people must be involved for the chick sexing. Checking a large number of chicks each day is very labor intensive and the work is tedious, requires special talent and demands tolerance to monotony. Other examples including related operations can be found in U.S. Pat. Nos. 3,994,292, 3,570,487, 3,704,688, and 3,777,752.

There are many advantages of chick sexing in the broiler industry. Because of the growth characteristics of male and female chickens, males tend to grow faster and larger at given conditions. Male broilers fed for an extra couple of weeks can grow to 6 or 7 pounds. For the same time, female birds have a slower growing rate with less weight gain. Raising male and female chickens separately has the advantages of:

1). Enhanced feeding efficiency: By growing and harvesting male and female broiler chickens differently, it enables the better management for optimum returns.
2). Improved de-bone meat production: Harvesting deboned meats by using large male broilers provided increased benefits at the marketplace.
3). Processing line efficiency: With reduced variation of large and small bird sizes, the equipment may be more precisely adjusted to achieve greater performance. The equipment can handle more uniform sized birds for enhanced yield, efficiency and productivity.

Technologies using machine vision have great potential to enable automated chick sex sorting operations. By using digital video cameras, automated mechanics, and computer image processing systems, the automated system will inspect chicks at high speed. The machine vision sorting can further enhance chick sexing practice with additional advantages of:

1). Higher throughput: With a speed of 10 chicks per second, the machine can finish the job in a timely manner and eliminate any bottlenecks of sexing operations.
2). Labor savings and cost benefits: Labor cost alone can exceed 0.6 cents per chick so that a substantial savings is possible for a 250,000 chick per day operation. Machine cost of something over $100,000 will have a very short payback.
3). Fewer human errors: The machine has the advantage of accuracy and consistency with reduced errors. There will be three sorting paths: male, female, and rework (for cases where the system receives too little information to process an individual chick). In case of a few very difficult chicks, human inspection could be used with minimal labor involvement.

To either present chick sexing practice or machine vision sexing technology, there are significant advantages in the competitive marketplace if such methods can be further automated, not only in gained feed and production efficiencies, but also in cost savings.

Various devices to further automate sexing have been proposed previously. For example, M. D. Evans, in "Feather Sexing of Boiler Chicks by Machine Vision" ASAE paper no. 903008, ASAE, St. Joseph, Mich. (1989), discusses such equipment. Also, P. T. Jones, S. A. Shearer and R. S. Gates in "Edge Extraction for Feather Sexing Poultry Chicks," Transcript of ASAE 3492): 635–640 (1991) discuss such equipment. U.S. Pat. No. 4,417,663 to K. Suzuki in 1983, and entitled "Apparatus for Determining the Sex of a Chick" also discusses similar equipment. However, the known art fails to teach a reliable, fast method for automatic chick sexing. Thus, a need exists for an improved, more automated process for chick sexing.

SUMMARY

The invention addresses the above referenced need in the art. In particular, the invention provides an improved method for automatic chick sexing.

Under regular lighting, the color intensity of down and feather of baby chicks are essentially the same and it is difficult to separate the feathers in the image. However, by using UV light, our new optical system significantly enhanced the feathers by suppressing the downs in images. It produced clear feather signals for subsequent identification and allocation of feathers in the image. The strong signal ratio between feather and down made it much easier for the consequent image processing without sophisticated noise removing process as proposed by Jones et al. (1991) and Evans (1989). (Because of the good contrast, the feather image segments could be obtained through thresholding with any value from 200 to 230 on the 255 maximum intensity scale. For consistency, a threshold value of 200 was used for all images throughout the experiment.)

Important features of the invention include a video camera, special lighting, an image processing system and a computer for analysis. The combination facilitates more efficient automatic chick sexing than previous devices.

The digital video camera captures a clear image of chick wings using selected light wavelengths (including long UV wavelengths). Special lighting architecture provides maximum illumination enhancement and feature extraction for the camera and the pattern recognition software. Lighting wavelength and camera wavelength sensitivity have been shown to have critical effects on image quality and feature extraction. The digital image processing system processes signals from the camera and it makes instantaneous image analysis. The computer system hosts the digital imaging system and it executes the decisions made by the digital image processing system.

Previously known and herein disclosed image processing algorithms for identification, feature extraction, and pattern recognition of chick sexes by wing feathers, include specialized software programs. They include high speed blurless imaging of chick presented by mechanical system as well as software algorithms that identify wing tips and extract male and female features. Other software includes fast pattern recognition algorithms to distinguish male and female chicks at an accuracy of up to 95% or higher at up to 12 chicks /sec. These software controlled electronics can also control the chick sorting mechanism.

Thus, a principal object of the present invention is to provide an improved method for chick sexing.

A related object is to provide a safe and inexpensive process that automates chick sexing.

Another object is to provide a chick sexing method that does not harm the chicks.

Yet another object of the present invention is to provide increased reliability in chick sexing operations.

DETAILED DESCRIPTION OF THE PREFERRED EMBODIMENTS

Figure 1:
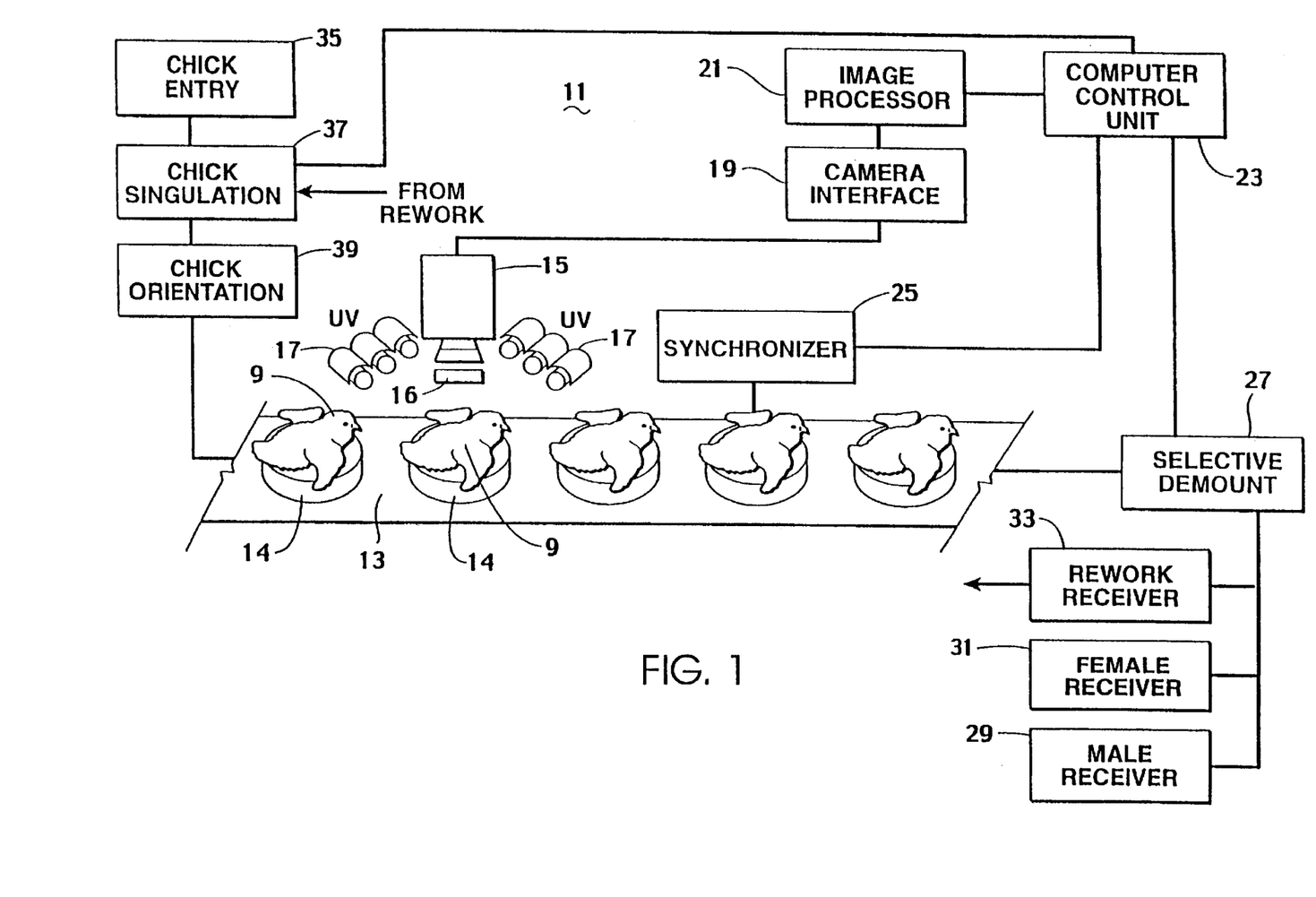
FIG. 1 is a schematic block diagram of apparatus for automatic feather sexing of poultry chicks using ultraviolet imaging according to the invention.

Referring to the drawings, and particularly FIG. 1, automatic feather sexing apparatus 11 is shown in schematic form wherein chicks about one day old are individually transported on a conveyor 13 having appropriate chick retainers 14. The motion of conveyor 13 in FIG. 1 is represented as from left to right.

Suitably positioned with respect to conveyor 13 is a digital video camera 15 preferably of the monochrome variety. However, camera 15 could be a multi-color camera rather than a black and white camera, if desired. The advantage of the monochrome, black and white camera is that it inherently provides higher resolution, all other things being equal. Camera 15 may provide, for example, approximately 1000 by 700 pixels resolution in a monochrome image. Alternatively, a lower resolution of 600 by 400 pixels or a higher resolution of 1200 by 1000 pixels could be employed.

It is an important feature of the invention that the video camera 15 have an electronic output that represents a response to a predetermined range of light wavelengths which excludes a significant portion of the visible light spectrum (approximately 380 to 800 nanometers). In this particular utility of feather sexing chicks, the preferred responsive range of light wavelengths is from about 340 to about 500 nanometers. The response of digital video camera 15 is preferably suppressed for a range of wavelengths above about 500 nanometers.

Preferably, camera 15 does not have an integral ultraviolet blocking filter which could suppress wavelengths desired to be accepted and camera 15 is preferably provided with a filter 16 which has a pass-band of wavelengths in the long ultraviolet, the violet, and the blue.

Figure 2:
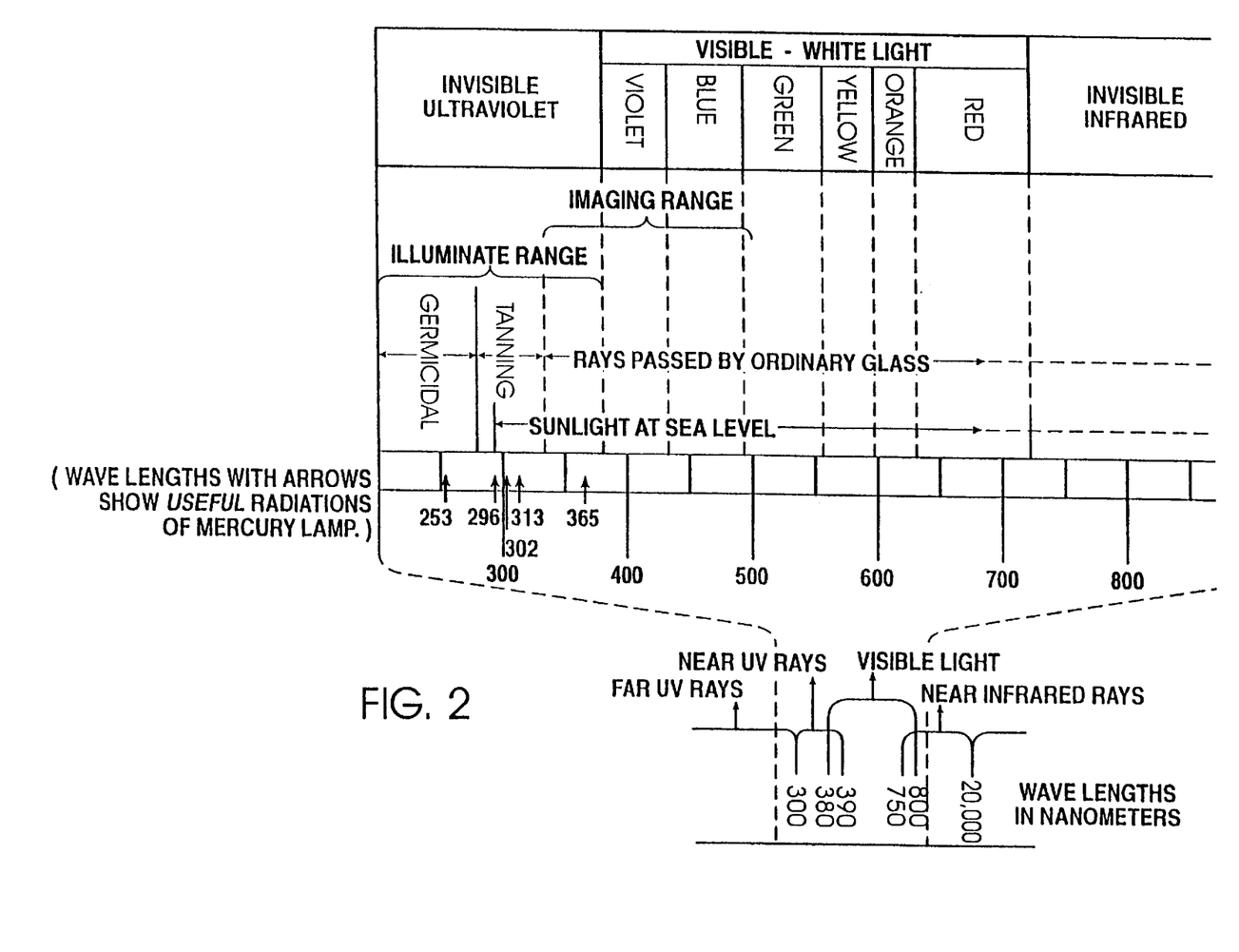
FIG. 2 is an explanatory diagram showing the ultraviolet visible and near-infrared light spectrum identifying portions thereof important for illuminating a subject and portions important for imaging fluorescence radiation from a subject.

FIG. 2 shows portions of the ultraviolet visible and infrared light spectrum and the range of wavelengths which video camera 15 is preferably responsive to, is marked "imaging range".

It should be appreciated that the arrangement illustrated in FIG. 1 and described above is only one way of obtaining a digital electronic image which is responsive to wavelengths of about 340 to 500 nanometers and discriminates against light wavelengths above about 500 nanometers. The desired result can be produced with any combination of use of filters such as filter 16 together with the inherent photoelectric characteristics of the video camera itself, such as video camera 15. Furthermore, one could employ a color camera that was responsive to violet and long ultraviolet wavelengths and electronically process the multiple color signals to reject or subtract green, yellow, orange, and red signals, thereby obtaining by electronic means a result similar to optical filter of a monochrome image.

The selective imaging of chick feathers, and particularly feather shanks, according to the invention is achieved by detection of fluorescent radiation rather than reflected light. Fluorescent radiation is produced by ultraviolet lamp arrays 17 illustrated as gas discharge tube similar to common fluorescent lights except that they are designed to maximize emission of ultraviolet wavelengths. In the preferred embodiment, ultraviolet lamp arrays 17 of the mercury vapor or similar type with tubular envelopes permitting transmission of long ultraviolet rays, also known as near-UV rays, with wavelengths from about 300 to about 390 nanometers. Preferably, illumination of the chicks 9 by visible light is avoided by enclosing the conveyor 13 and the video camera area and lamp arrays 17 in an opaque enclosure. The lamps of lamp arrays 17 will customarily be designed to minimize the emission of visible light (above about 400 nanometers).

Referring again to FIG. 2, it will be seen that a key element of the present invention is that the chicks being imaged are illuminated by invisible, ultraviolet light in the range of wavelengths marked "illuminate range" while the imaging apparatus represented by video camera 15 is caused to selectively respond to a range of visible light wavelengths at the shorter wavelength end of the visible spectrum below about 500 nanometers and extending somewhat into the ultraviolet. It may be noted that there is a potential for slight overlap between the illuminate range and the imaging range as depicted in FIG. 2 and, while one ideally might wish to avoid this, it has been found to present no obstacle to effective function of the imaging system.

It will also be noted in FIG. 2 that the illuminate range as marked extends well into the far UV or short ultraviolet wavelength region. The preferred embodiment of FIG. 1, however, employs long wavelength ultraviolet lamps in lamp array 17 for which the emission of wavelengths below about 300 nanometers is blocked by the tubular lamp envelope. There is, however, no reason to believe that far ultraviolet or shortwave ultraviolet of wavelengths of 250 to 300 nanometers or below could not be used in place of or in addition to the longer wave ultraviolet from about 300 to about 390 nanometers. If one chose to use far ultraviolet rays below 300 nanometers wavelength, then the overlap between the illuminate range and the imaging range could be eliminated for whatever advantage that might achieve. The disadvantage in using far UV or short wavelength radiation is that it is potentially harmful to biological tissue and, particularly, potentially harmful to the eyes.

Although it is not employed in the preferred embodiment, one may, in an alternative embodiment, choose to operate the UV lamp arrays 17 in a pulsed fashion while video camera 15 is synchronized to capture the image at the time of the pulse. Alternatively, the camera could be synchronized to capture the image a few milliseconds after the peak of the light pulse from the UV lamp array 17. Such a delay would tend to eliminate response from reflected light rather than fluorescent light in the overlap between the illuminate range and the imaging range.

The video output from camera 15 is received by camera interface 19 of conventional form and transmitted in the appropriate format to an image processor 21. Image processor 21 may be of known configuration similar to that shown in the paper "Edge Extraction Algorithm for Feather Sexing Poultry Chicks",P. T. Jones, S. A. Scherer, R. S. Gates, Transactions of the ASE Volume 34(2): March–April 1991, published by American Society of Agricultural Engineers.

Figure 3:
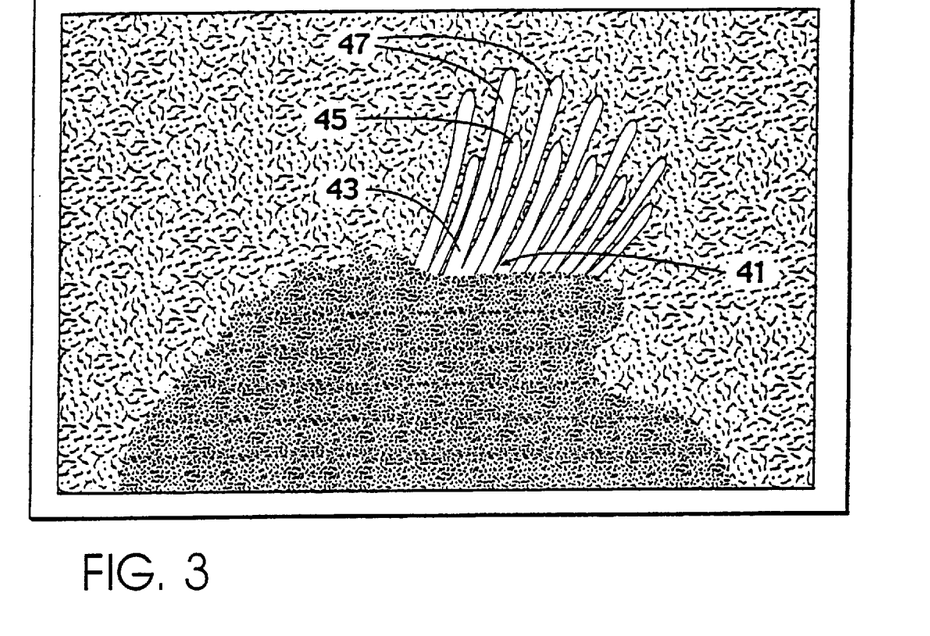
FIG. 3 is an artist's presentation showing the manner in which the imaging system of the invention causing feathers, particularly the shanks thereof, to be prominently displayed by reducing background light from down, etc. for a female chick.
Figure 4:
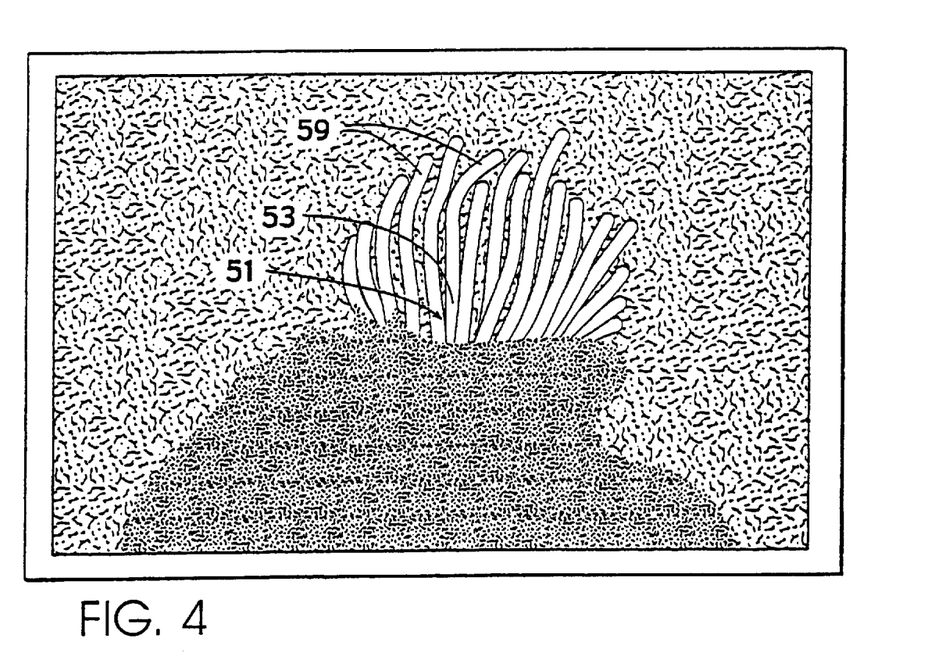
FIG. 4 is an artist's presentation showing the manner in which the imaging system of the invention causing feathers, particularly the shanks thereof, to be prominently displayed by reducing background light from down, etc. for a male chick.

FIGS. 3 and 4 show an artist's depiction of the fluorescent light image captured by the camera 15 showing how the fluorescent light from the down of the chick, generally in the yellow region of the visible spectrum, is suppressed while shorter wavelength light from fluorescence of the chick feathers, and particularly the feather shanks, is dominant about all of the background.

This enables the image processor 21 to identify the longer feathers and feather shanks 47. In similar fashion the shorter feathers and feather shanks 45 are identified using edge detection and similar image processing techniques and the distinctive pattern of alternate short and long feathers and feather shanks of FIG. 3 can be identified in the overall wing image 41 and the feather cluster 43. It is thereby possible to identify the image of FIG. 3 as that of a female chick. In FIG. 4 a similar artist depiction shows the enhanced image obtained by fluorescent imaging wherein the wing image 51 with feather cluster 53 also has distinctive feather and feather shank images 59 but they are not markedly distinguishable as between long feathers and shanks and short feathers and shanks as in the FIG. 3 image for the female chick. Thus the image of FIG. 4 is identifiable as that of a male chick wing after appropriate processing by image processor 21. To the extent necessary, further processing of the data from image processor 21 may be carried out by computer control unit 23 and computer control unit 23 in conjunction with synchronizer 25 and the signal provided therefrom operates selective demount apparatus 27 to route the chicks in a sorting process according to whether they are determined to be male or female. Female chicks are routed to female receiver 31 and male chicks are routed to male receiver 29.

The logic of image processor 21 in control unit 23 will necessarily, in some cases, have insufficient information to make a positive determination of male or female, in which case a signal is sent to selective demount 27 such that the chick is routed to the rework receiver 33 from whence it is automatically or manually reintroduced from rework into the chick singulation apparatus 37. Chick singulation apparatus 37 also receives the continuous feed of chicks from chick entry apparatus 35 and chick singulation apparatus 37 transfers the chicks individually to chick orientation unit 39 which positions the chicks 9 on respective chick retainer units 14. Chick orientation apparatus 39 and chick singulation apparatus 37 may be of the form known and utilized in handling live baby chicks for purposes of automatic inoculation or the like, as shown in U.S. Pat. Nos. 3,994,292, 3,570,487, 3,704,688 and 3,777,752, the teachings of which are incorporated by reference herein.

As mentioned earlier, it is important in pattern recognition of chick sex to capture and allocate a clear and distinctive wing feather image. To achieve this, down must be totally separated from the flight wings in the image. The aforementioned optical system with imaging system is further discussed and was used for chick sexing in the following example.

EXAMPLE 1

A group of surrounding UV lights of long wavelength centered at 360nm within the eye safe range were used to illuminate the chicks. Under UV, the materials of down and feather emitted differently, although they are almost the same in visible and longer wavelength range. In front of the CCD camera, the optical filter eliminated any unwanted yellow light emitted from downs. The camera then produced images with strong signals on flight wings while significantly suppressing the down signals.

Two methods were tested as well to perform the pattern recognition of chick sexes. One was a direct intuitive approach of feather pair analysis similar to human inspection. The other method was a global approach using curve fitting of wing tip patterns. Both methods are presented below with analysis of advantages and disadvantages.

In pair matching, blob analysis was used to analyze wing feather relationships and variations. Because the length of wing feather can be different from center sides, using simple overall average length variations to determine male or female was not adequate. The length difference must be compared with adjacent feathers. First, image labeling was used to label each feather segment. Filters were used to filter out any insignificant segments and unwanted such as connected large segments to obtain a valid blob set B. Second, features including length $l_k$, centroid $c_k$, [x,y], and tip coordinate $tip_k$ [x,y] were calculated for each feather blob to obtain the feature set:

$$\{b_k(l_k,\ c_k[x,y],\ tip_k[x,y]),\ b_k \in B,\ \text{and}\ k=1,3,5,\ldots N\} \qquad (1)$$

Third, each blob was sequenced and paired with adjacent feathers:

$$Pair_{k,k+1}=(c_k[y_k]-c_k[[y_{k+1}])/(c_k[x_k]-c_k[x_{k+1}])<\overline{Pair} \quad (2)$$

where, Pair is the average distance between feather shaft:

$$\overline{Pair} = \sum_{k}^{N} Pair_{k,k+1}/N, K = 1, 3, 5, \ldots, N \quad (3)$$

For all the feather pairs, the normalized length difference ration of each pair was obtained by:

$$\Delta l_k=|l_k-l_{k+1}|/((l_k+l_{k+1})/2) \quad (4)$$

The average of difference of length pairs was therefore:

$$\delta = \sum_{k}^{N} \Delta l_k/2N \quad (5)$$

The value of $\delta$ indicates the feather difference between male and female chicks. Finally, the sex of chicks in determined by a set of thresholds $T_m$, $T_f$ that $$Sex = \begin{cases} male, & \text{if } \delta \leq T_m \\ female, & \text{if } \delta \leq T_f \\ uncertain, & \text{if } T_m<\delta<T_f \end{cases} \quad (6)$$

The uncertain category is intended clear classification of male and females. In practical design, the uncertain chicks can be either feed back for another inspection or separate for manual inspection. Naturally, according to hatchery managers, there is about two percent of newly hatched chicks are uncertain for their sexes judging by feathers. The method provided a intuitive method in patent analysis which is very similar to that of human inspection. The main disadvantage, however, is that some of the feather blobs does not always showed the true length of wing feathers at the end, i.e. the opposite side of wing tips.

As an alternative method to wing pairing, a global curve fitting variance method using curve fitting was used to determine the feather pattern difference. For each blob $b_k$ in the image, the coordinates of each feather tips were extracted:

$$\{Tip_k(x, y), k=1, 2, \ldots N \text{ blobs}\} \quad (7)$$

The set of discrete coordinates was then fitted with a 5th order polynomial and the correlation coefficient $R^2$ value of the curve fitting of wing tip coordinates $\{Tip_k\}$ was small, it would be a male chick because of variance. Otherwise it should be a female chick. Further, residuals of between the predicted from curve fitting and the actual values indicated the difference in length of chick wing feathers. An average of the residual $_\gamma$ for each chick was obtained from:

$$y = \sum_{k}^{N} |y_k(x_k) - y_k(x_k)|/N, x_k, y_k \in Tip_k \quad (8)$$

where, y (x) and y (x) are actual and predicted values from curve fitting respectively. By using r alone, the classification rules was therefore given as:

$$Sex = \begin{cases} male, & \text{if } y \leq R_m \\ female, & \text{if } y \leq R_f \\ uncertain, & \text{if } R_m<y<R_f \end{cases} \quad (9)$$

This approach was relative simple once the set $\{Tip_k\}$ was obtained for all the feather blob. It was expected that there might exist certain cases, where the difference of the wing shaft of a female chick was very small, that the curve fitting could yield a small y and $R^2$ values. However, for a given magnification by the optical system, the depth of field is generally limited. The variation caused by imaging of chicks within focus is therefore small.

Notice that both of these methods are invariance to orientations and locations of feather blobs in image. The scale is relatively invariant after the optical settings are fixed. This characteristic of invariance is essential for on-line high speed baby chick separations.

Twenty baby chicks within 24 hours old were initially analyzed for parameter settings. For statistical analysis, a separate batch of 100 chicks with 50 each sex were tested. The statistical results of both paring and curve fitting methods are discussed in the following sections.

Figure 5:
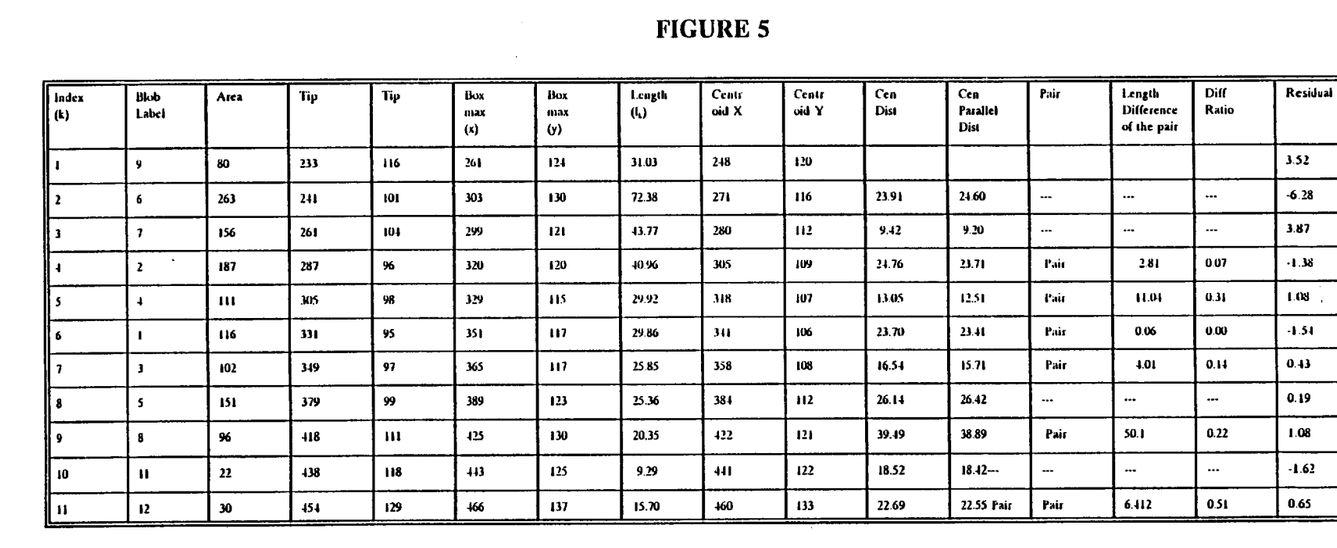
FIG. 5 is a table representing the feature analysis of typical blobs for a sampling of male chicks.
Figure 6:
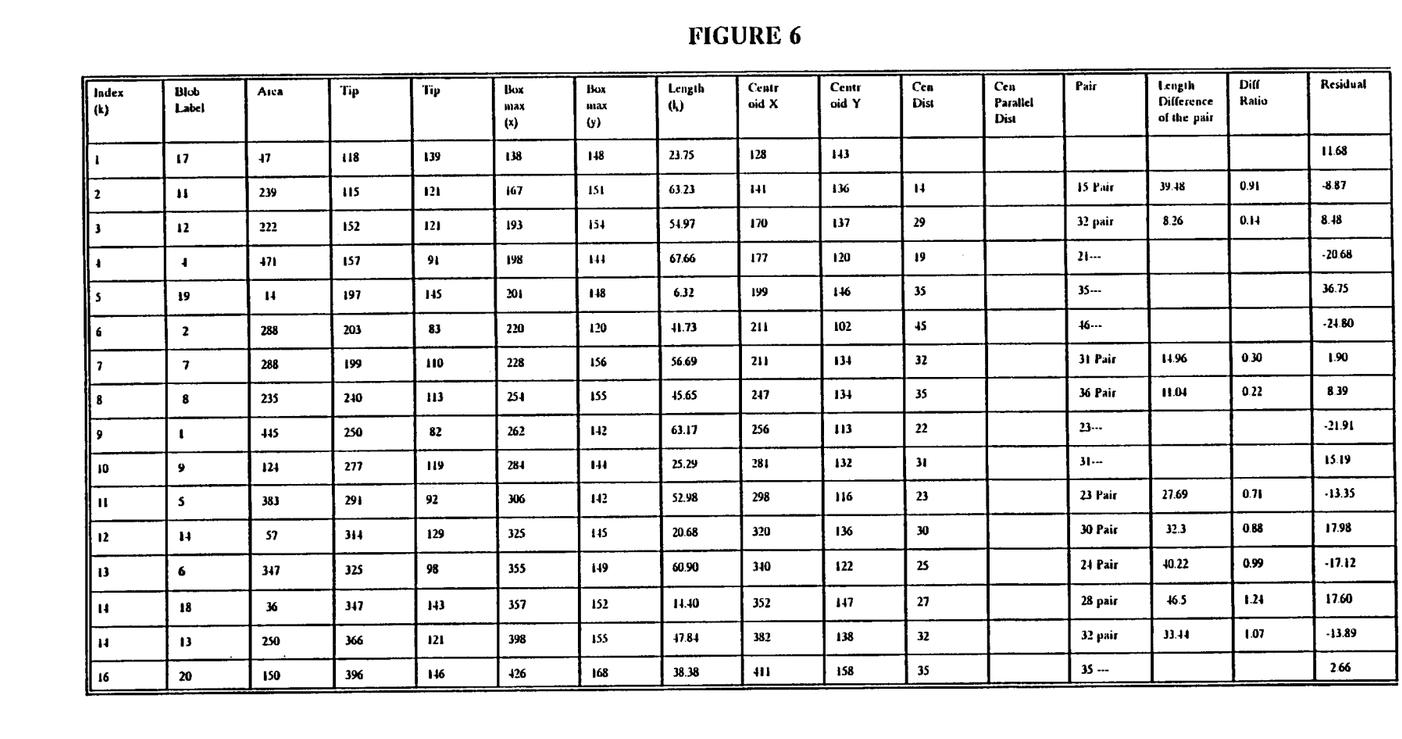
FIG. 6 is a table representing the feature analysis of typical blobs for a sampling of female chicks.

The results of the typical blob analysis are shown in FIGS. 5 and 6. The numbers in the image indicate labels of each feather blob. The features of each blob and analysis are shown in FIGS. 5 and 6. It can be seen that the average difference ratio $\delta$ for the female is 0.72 and $\delta$ for the male is 0.21, which is smaller than the value of male chick. The statistical result showed, however, that there exist overlaps in $\delta$ values between males and females. The classification resulted merely 79% male and 54% female correctness rates when the $T_m$ and $T_f$ were both set equally to 0.4. The main cause of the error is because that for certain blobs, the female feather lengths were incorrectly extracted. Although the paring method is straight forward and intuitive, the length of blob only without measuring from a common base line of feathers created the artifact for accurate classification. Considering orientations of images from acquisition, a base line can not be obtained easily and accurately from fixed coordinates.

Figure 7:
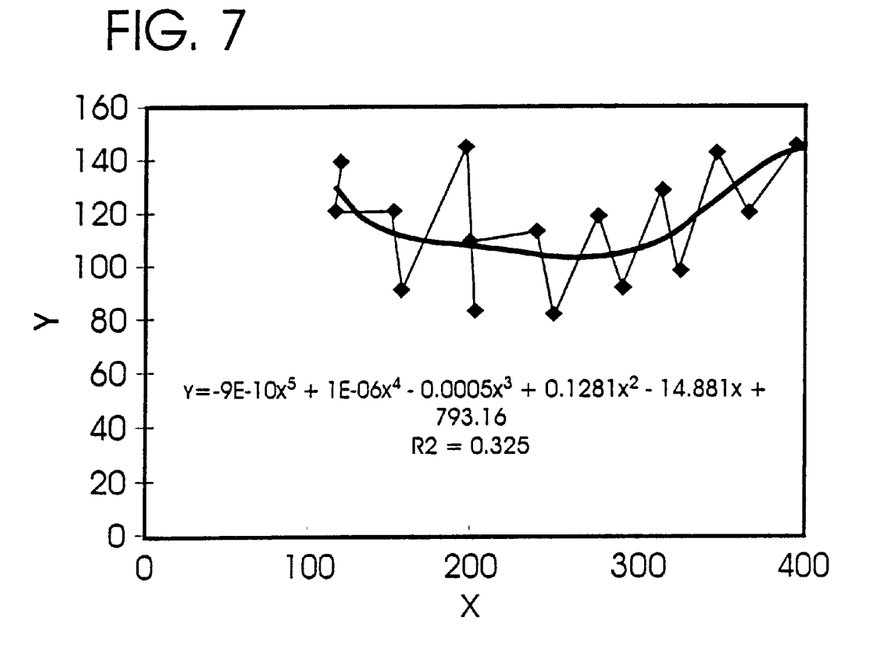
FIG. 7 is a graph depicting typical curve fitting for the wing feather tips for a sampling of female chicks.
Figure 8:
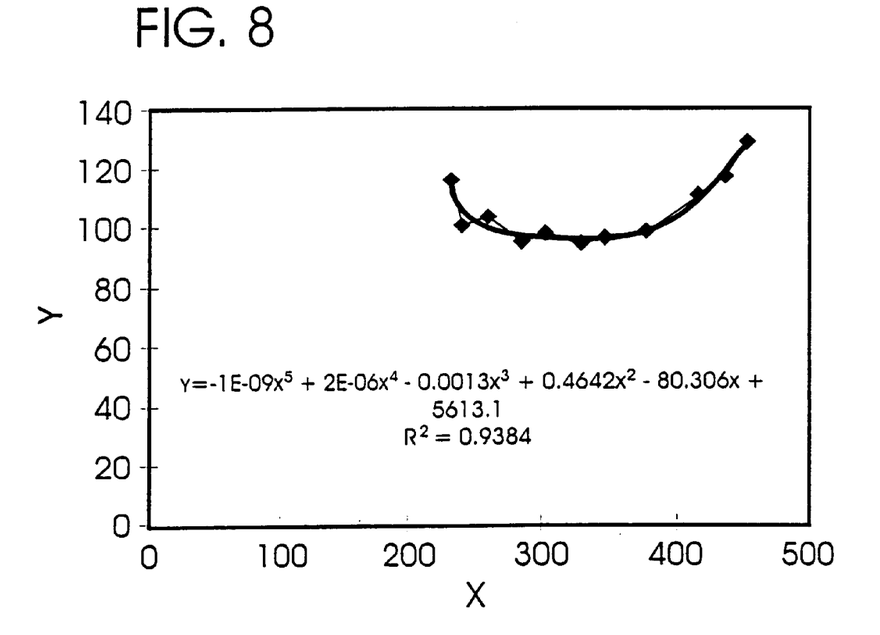
FIG. 8 is a graph depicting typical curve fitting for the wing feather tips for a sampling of male chicks.

In comparison, the curve fitting method yielded much better results than the paring blob measurement method. FIGS. 7 and 8 demonstrate the result of a typical curve fitting of a male and female chick wing feather tips. The polynomial equation produced an approximate middle line between the long and short feather shafts. As can be seen from the Figure, the female had a low $R^2$ (0.325) and the male chick had a high value of $R^2$ (0.938). For the same chicks, the values of residuals $_\gamma$ were 16.05 for the female and 1.97 for the male, which showed significant difference.

Figure 9:
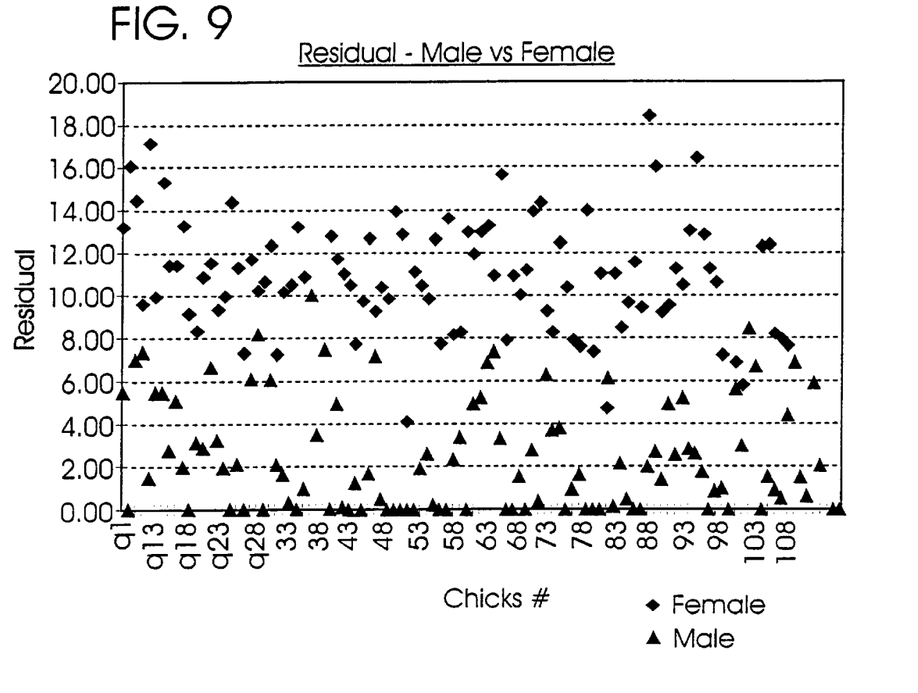
FIG. 9 is a graph depicting the residual values resulting from the curve fittings of s sampling of female and male chicks.
Figure 10:
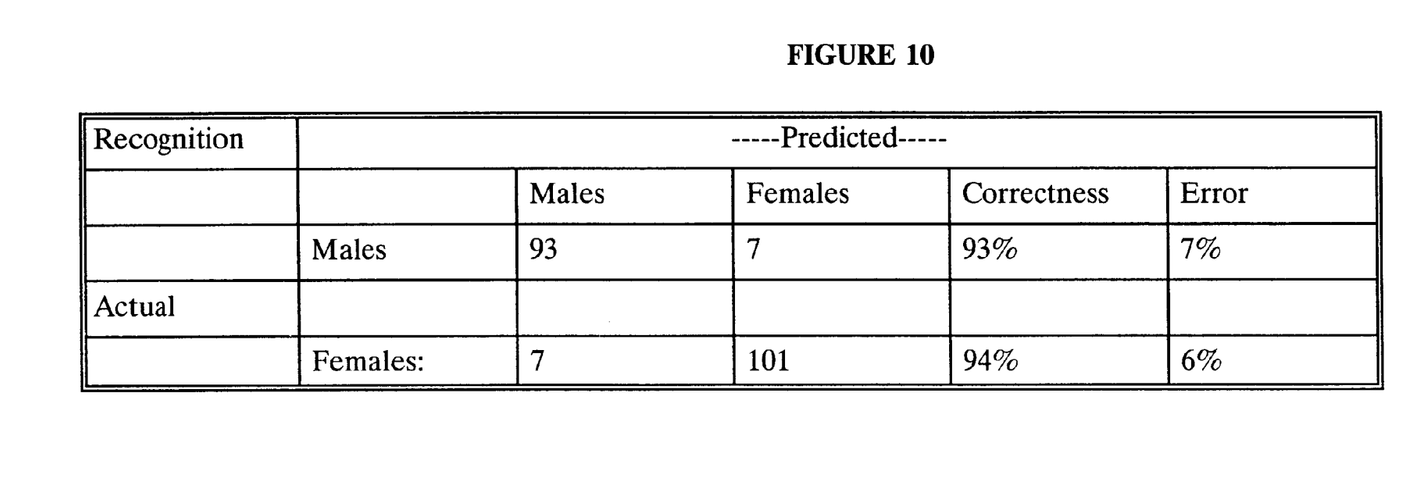
FIG. 10 is a table depicting the accuracy recognition results for a sampling of chicks.

FIG. 9 shows the result plot of residuals of a sampling of 100 chicks. Both wings of each chick ware imaged for data analysis although only one wing imaging is need in actual applications. The distribution of the residuals for the females are mostly above those of male chicks. FIG. 10 gives the classification result of 100 chicks with a predetermined threshold $R_m=R_f=7$ unit in length. Based on the criteria of residual alone, the test of 100 chicks yielded a rate of 93% female and 94% male chicks being correctly classified.

Figure 11:
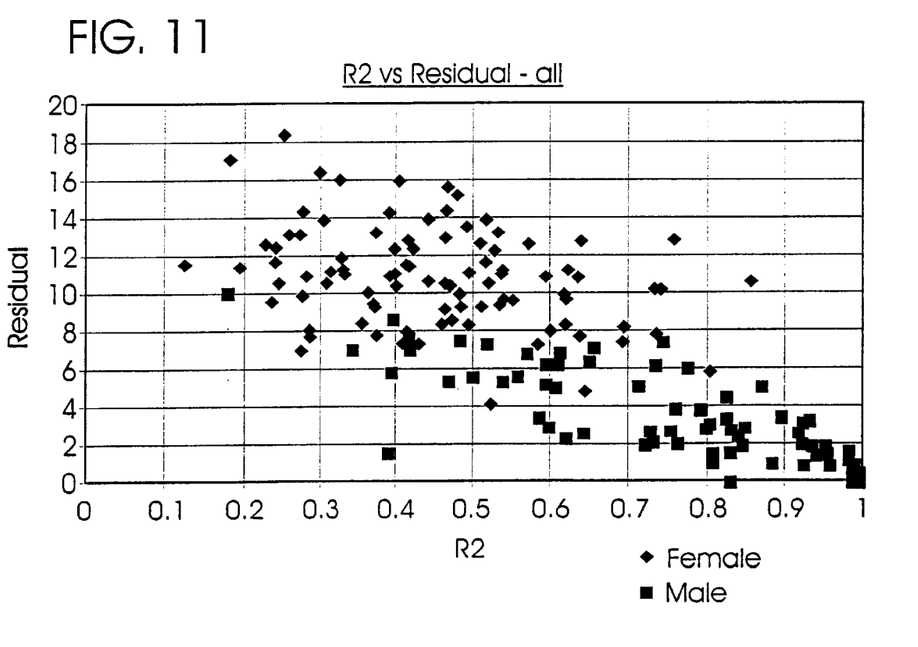
FIG. 11 is a graph depicting the $R^2v$. Residual values for the sampling of chicks; and, FIG. 12 is a table depicting the error rates with a zone of threshold set at $R_m=6$ and $R_f=8$ unit length.

FIG. 11 showed the plot of residual vs. $R^2$ of 100 tested chicks. It can be seen that the distribution of the $_\gamma$ and $R^2$ values are different with the males in the low right diagonal and the females in the up left regions. Since an extremely low $R^2$ value indicates variance in curve fitting, additional rules can be used for improved classification. For instance, if $R^2$ value of a chick is lower than 0.3, the chick is mostly likely to be a female, although its residual may be slightly lower than certain values. Therefore, the combination of $_\gamma$ and $R^2$ could be used as two dimensional separation for improved classification.

Figure 12:
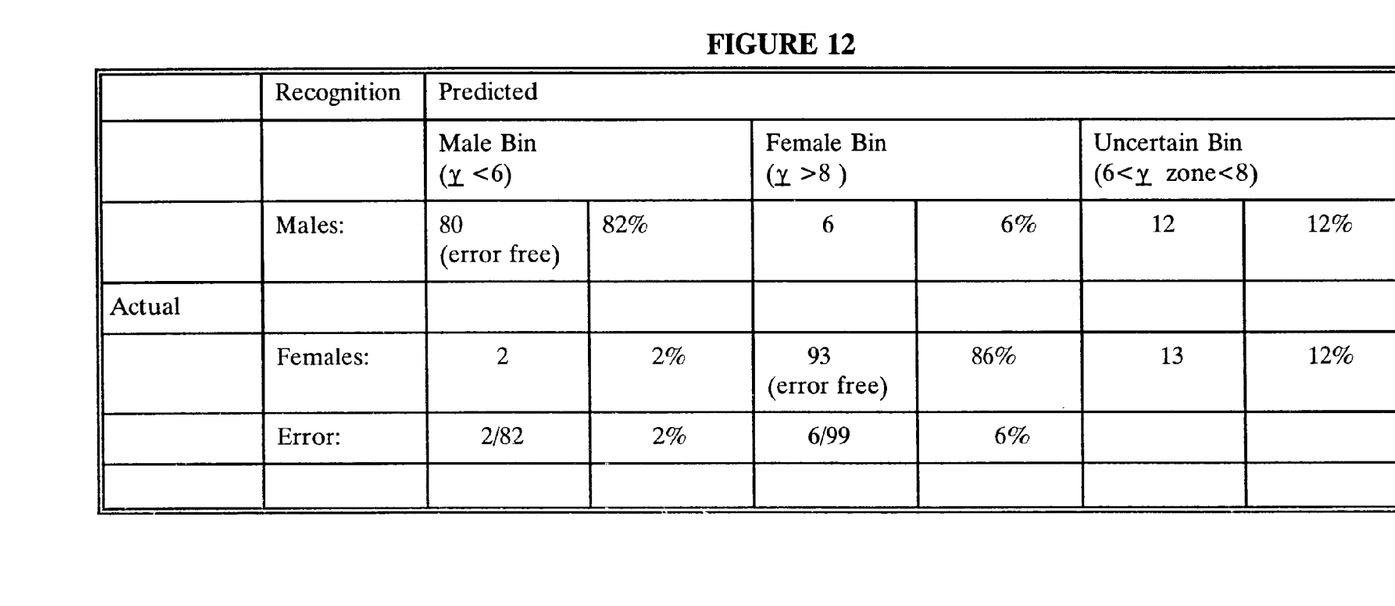

For practical considerations, a zone of threshold can be applied by using $R_m$ and $R_f$ ($R_m<R_f$). FIG. 12 shows the example results if $R_m$ and $R_f$ are set at 6 and 8 (7±1) unit lengths respectively. By setting a zone of threshold, it virtually enables the extra guarantee that the sorting result in the male bin or female bin will be more likely to be free of mistakes. The percentage in the uncertain category can be left for manual inspection or fed to return flow for another inspection. Since this uncertain category is generally very small (0–15% depending on settings), the labor requirement comparing to all manual inspection can be significantly reduced.

From the imaging and statistical analyses in this example, it was found that the optical system was effective in providing clearly contrasted images between downs and feathers. With the downs being significantly suppressed, the optical system made the consequent image processing and pattern recognition of chick feathers much easier than using regular visible lighting. For image analysis, the criteria using the average residual from the method of curve fitting of wing tips yielded satisfactory results with 93% and 94% correct separations of male and female chicks respectively. The average curve-fitting residual appeared to be a better criteria that using $R^2$ and the feather pairing of direct geometrical feature analysis of feather blobs using length ratio, where both latter criteria yielded relative lower rates of correct classifications of male and female chicks.

Whereas, the present invention has been described in relation to the drawings attached hereto, it should be understood that other and further modifications, apart from those shown or suggested herein, may be made within the spirit and scope of this invention.

What is claimed is:

1. A method of collecting digital video data of baby chick feathers to enable sex determination of individual chicks comprising:
   (1) illuminating materials including chick down and feathers with ultraviolet light from a desired direction, said light predominantly being at wavelengths of from 250 nanometers to 420 nanometers;
   (2) producing a filtered ultraviolet and visible light pattern from light reflected or emitted from said materials due to the ultraviolet illumination thereof, the filtering of said light being effective to provide an effective cutoff for light of wavelength longer than about 450 nanometers;
   (3) forming an electronic video image of said materials from said filtered ultraviolet and visible light pattern; and, whereby specific portions of said emitting fluorescence at ultraviolet or short visible wavelengths are readily distinguished from background or other portions which fluoresce to produce predominantly longer wavelength visible light or infrared light.

2. A method as recited in claim 1 wherein the materials including chick down and feathers is an individual baby chick and further including a step of digitally analyzing said electronic video image to identify the feather pattern of said individual chick as being characteristically male, characteristically female, or indeterminate.

3. A method as recited in claim 2 further including the step of repeating all previous steps for successive individual chicks and designating each chick as to characteristic male feather pattern, characteristic female feather pattern or indeterminate feather pattern.

4. A method as recited in claim 3 further including the step of physically segregating each baby chick in accordance with its designation of male, female, or indeterminate.

5. A method as recited in claim 1 wherein the step of forming an electronic video image is performed by a video camera oriented and controlled to image an area generally centered at the wing feathers of one of the wings of a baby chick automatically transported through the field of view of the camera.

6. A method as recited in claim 5 further including an image processor receiving electronic data from said video camera and programmed with pattern recognition digital processing functions to produce a signal identifying the video image as a characteristic male pattern, a characteristic female pattern or an indeterminate pattern.

7. A method of collecting digital video data of baby chick feathers to enable sex determination of individual chicks comprising:
   (1) illuminating materials including chick down and feathers with ultraviolet light from a desired direction, said light predominantly being at wavelengths of from 250 nanometers to 420 nanometers;
   (2) producing a filtered ultraviolet and visible light pattern from light reflected or emitted from said materials due to the ultraviolet illumination thereof, the filtering of said light being effective to provide an effective cutoff for light of wavelength longer than about 450 nanometers;
   (3) forming an electronic video image of said materials from said filtered ultraviolet and visible light pattern, said electronic video image being formed by a video camera oriented and controlled to image an area generally centered at the wing feathers of one of the wings of a baby chick automatically transported through the field of view of the camera; and,
   (4) processing said electronic data from said video camera and programmed with pattern recognition digital processing functions to produce a signal identifying the video image as a characteristic male pattern, a characteristic female pattern or an indeterminate pattern.

8. A method as recited in claim 7 wherein the materials including chick down and feathers is an individual baby chick and further including a step of digitally analyzing said electronic video image to identify the feather pattern of said individual chick as being characteristically male, characteristically female, or indeterminate.

9. A method as recited in claim 8 further including the step of repeating all previous steps for successive individual chicks and designating each chick as to characteristic male feather pattern, characteristic female feather pattern, or indeterminate pattern and further including the step of subsequently segregating each of said chicks into a group of male chicks or female chicks.

10. A method as recited in claim 9 further including the step of physically segregating each baby chick in accordance with its designation of male, female, or indeterminate.

11. An apparatus for collecting digital video data of baby chick feathers to enable sex determination of individual chicks, said apparatus comprising:
   means for illuminating materials including chick down and feathers with ultraviolet light from a desired direction, said light predominantly being at wavelengths of from 250 nanometers to 420 nanometers;
   means for producing a filtered ultraviolet and visible light pattern from light reflected or emitted from said materials due to the ultraviolet illumination thereof, the filtering of said light being effective to provide an effective cutoff for light of wavelength longer than about 450 nanometers;
   means for forming an electronic video image of said materials from said filtered ultraviolet and visible light pattern; and,
   whereby specific portions of said emitting fluorescence at ultraviolet or short visible wavelengths are readily distinguished from background or other portions which fluoresce to produce predominantly longer wavelength visible light or infrared light.

12. The apparatus as recited in claim 11 wherein the materials including chick down and feathers is an individual baby chick and further including means for digitally analyzing said electronic video image to identify the feather pattern of said individual chick as being characteristically feather pattern, characteristic female feather pattern, or indeterminate feather pattern.

13. The apparatus as recited in claim 11 further including means for physically segregating each baby chick in accordance with its designation of male, female, or indeterminate.

14. The apparatus as recited in claim 11 wherein the means for forming an electronic video image is performed by a video camera oriented and controlled to image an area generally centered at the wing feathers of one of the wings of a baby chick automatically transported through the field of view of the camera.

15. The apparatus as recited in claim 11 further including an image processor receiving electronic data from said video camera and programmed with pattern recognition digital processing functions to produce a signal identifying the video image as a characteristic male pattern, a characteristic female pattern or an indeterminate pattern.

16. The apparatus as recited in claim 15 further including means for physically segregating each baby chick in accordance with its designation of male, female, or indeterminate.

* * * * *